April 7, 1959 F. A. BOWERS 2,881,053
PROCESS FOR REMOVING INERT GASES FROM AMMONIA SYNTHESIS GAS
Filed Oct. 26, 1953
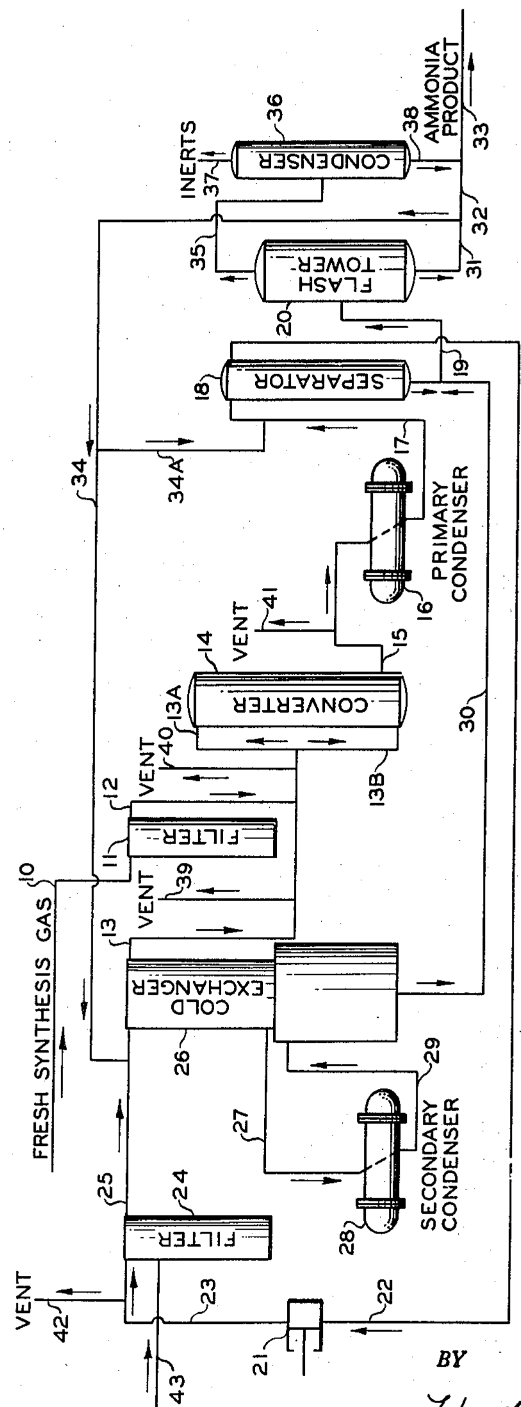
INVENTOR.
F. A. BOWERS
BY
Hudson & Young
ATTORNEYS 2,881,053
Patented Apr. 7, 1959

2,881,053

PROCESS FOR REMOVING INERT GASES FROM AMMONIA SYNTHESIS GAS

Frederick A. Bowers, Cactus, Tex., assignor to Phillips Petroleum Company, a corporation of Delaware Application October 26, 1953, Serial No. 388,164

13 Claims. (Cl. 23—198)

This invention relates to the removal of inert gases from other gases. In one aspect this invention relates to the removal of inerts from gaseous reactants. In another aspect this invention relates to removing at least one inert from a mixture of inerts contained in a stream of gaseous reactants. In another aspect this invention relates to preferentially absorbing at least one inert from a mixture of inerts. In still another aspect this invention relates to preferentially absorbing at least one inert from a mixture of inerts contained in a stream of gaseous reactants. In still another aspect this invention relates to preferentially absorbing at least one inert from a mixture of inerts contained in a stream of gaseous reactants so as to increase the partial pressure of the remaining inerts. In still another aspect this invention relates to a method for increasing the effectiveness of an absorbent employed to remove inert gases from other gases. In still another aspect this invention relates to employing the product of a process to remove inert gases from a stream of reactant gases charged to said process. In still another aspect this invention relates to preferentially absorbing in a non-gaseous absorbent at least one inert from a mixture of inerts to increase the partial pressure of the remaining inerts so as to increase the solubility of said remaining inerts in said absorbent. In still another aspect this invention relates to the removal of methane from a mixture of inerts. In still another aspect this invention relates to subjecting the cycle gases in an ammonia synthesis plant to liquid ammonia so as to preferentially absorb methane from a mixture of inerts contained in said cycle gases.

The removal of impurities from reactants charged to the process is a problem faced in almost every manufacturing process. In some processes comparatively simple methods are employed while in others, depending upon the nature of the impurity, more elaborate methods are necessary. In some processes the impurities are removed by chemical methods, i.e., an agent is selected which reacts chemically with the impurity but not with the reactants and thereby removes the impurity. In some processes physical methods such as liquid scrubbing, solvent extraction, solid contacting, screening, magnetic separation, flotation, etc., are employed. In still other processes chemical and physical methods are both employed. The method chosen depends upon the nature of the impurity and the nature of the reactants from which the impurity is to be removed.

Generally speaking, solids are less difficult to purify than liquids and liqiuds are less difficult to purify than gases. This is particularly true when the impurities to be removed from a stream of reactant gases are inert gases. Being inert, the inert gases do not react chemically and one is, therefore, limited to physical methods for their removal. Furthermore, these inerts are usually present in small quantities only. Therefore, one is not only limited to physical methods of removal, but is faced with the problem of removing small volumes of inerts from large volumes of the reactant gases, in addition to the normal problems of gas purification. In any process using gaseous reactants it is desirable to remove the inert gases since they dilute the reactants. In a continuous process wherein the unreacted gases are recycled it is imperative to remove the inert gas impurities. Otherwise, the concentration of inerts in the system will build up to the point where the process becomes inoperable.

In the well-known Haber process for the manufacture of ammonia it is important that the nitrogen and hydrogen be properly purified before being charged to the catalytic synthesis step of the process. The impurities in said gases will depend upon their source. One commonly used source of hydrogen is the catalytic reforming of natural gas to produce carbon monoxide and hydrogen, followed by the well-known water-gas reaction to convert the carbon monoxide to carbon dioxide and produce more hydrogen. A portion of the hydrogen is burned with air to produce nitrogen and the mixture of gases is treated for removal of carbon monoxide and carbon dioxide. The preparation of the synthesis gas is controlled so that the final gas contains hydrogen and nitrogen in the molar ratio of approximately 3 to 1.

When the synthesis gas is prepared as outlined above it contains some inerts such as methane, helium, argon, neon, krypton, and xenon which are not removed in the above-described purification process. The latter three gases are present in extremely low concentrations. Therefore, the total inerts are usually spoken of as comprising methane and helium plus argon and are so designated below. Methane, strictly speaking, is not an inert gas. However, insofar as the synthesis step of an ammonia synthesis plant is concerned it is inert. For that reason it is so characterized herein. An inert can be defined as a neutral substance, i.e., one being devoid of active chemical properties. Therefore, in a stream of reactants any substance contained therein not taking part in, or promoting the reaction, can be considered an inert.

In an ammonia synthesis plant the unreacted gases from the converted are recycled, along with fresh synthesis gas, to the inlet of the converter. Therefore, while the concentration of total inerts in the fresh synthesis gas is low, the concentration of inerts in the recycle stream increases to very high values unless the said inerts are continuously removed from the system. When the inerts reach too high a concentration the efficiency of the converter is reduced due to lower effective pressure of the reactants and reduction of capacity. A small amount of inerts is continuously absorbed in the liquid ammonia removed from the system to storage. However, the amount absorbed is not sufficient to keep the concentration of inerts from building up to excessive values. It has been customary to keep the concentration of inerts in the system within tolerable limits by continuously venting a portion of the system gases.

This venting to purge out inerts inevitably causes the loss of some ammonia, hydrogen, and nitrogen from the system. This represents a loss of potential plant production and it is, therefore, highly desirable that this loss be eliminated or reduced to an absolute minimum.

I have found that methane is preferentially absorbed by liquid ammonia from a mixture of inerts comprising methane and helium plus argon. The preferential absorption of methane, over the helium plus argon, causes a build-up of the concentration of helium plus argon in the cycle gases. At a given concentration of total inerts in the cycle gas and at a given pressure, the helium plus argon, in the absence of the methane, will have a greater partial pressure. The partial pressure of a gas, in a mixture of gases, is defined as the pressure which it would exert if it alone were present in the volume occupied by the mixture of gases. The solubility in a liquid, of individual gases present in a mixture of gases, is directly proportional to their individual partial pressures and is practically independent of the presence of the others, i.e., the concentration of a dissolved gas in solution in a liquid is directly proportional to the concentration of the undissolved gas in the free space above the liquid. Therefore, the greater partial pressure of the helium plus argon increases the solubility of said helium plus argon in the liquid ammonia, to the extent, that all of the inerts entering the system can be removed therefrom by means of the liquid ammonia, thus eliminating any purge by venting.

I have further found that by increasing the amount of liquid ammonia employed to contact the system gases the greater partial pressure of the helium plus argon is even more effective. Thus, by introducing liquid ammonia into the cycle gas stream at suitable points the system can be operated at lower inerts concentrations, without purging by venting, than is otherwise possible.

According to the invention there is provided a method of purging inerts from a stream of gaseous reactants which comprises preferentially absorbing in an absorbent at least one inert from a mixture of inerts contained in said gaseous reactants to increase the partial pressure of the other said inerts to the extent that they too can be absorbed by said absorbent and thereby purge said gaseous reactants of inerts.

Further according to the invention there is provided a method of operating a synthesis plant wherein gaseous reactants are reacted to form a normally gaseous product, which is subsequently liquefied, which comprises, recycling a portion of said liquefied product to points in the system to preferentially absorb at least one inert from a mixture of inerts contained in said gaseous reactants to increase the partial pressures of the other of said inerts to the extent that they too can be absorbed in said liquefied product, flashing said absorbent to remove absorbed inerts therefrom and thereby purge said reactant gases of inerts.

Thus, when practicing my invention in an ammonia synthesis plant methane in the cycle gases is preferentially absorbed in the liquid ammonia product and the concentration of the remaining inerts, helium plus argon, is purposely allowed to build up to the increase the partial pressures thereof to the extent that they too can be absorbed in the liquid ammonia.

The drawing is a flow sheet illustrating in diagrammatic form the several embodiments of my invention as applied to the synthesis step of the Haber process for manufacturing ammonia.

Referring now to the drawing: Fresh synthesis gas comprising hydrogen and nitrogen in the molar ratio of approximately 3 to 1, and containing approximately 1.2 percent total inerts, enters the system under approximately 5400 p.s.i.g. through line 10, passes through filter 11, and line 12 to line 13 wherein it is admixed with system cycle gases (described further below). Said admixture in line 13 is passed through lines 13A and 13B into converter 14 wherein said gases contact an iron oxide catalyst at a temperature within the range of about 500 to 520° C. and a portion thereof is converted into ammonia. The gaseous reaction mixture is withdrawn through line 15 to primary condenser 16 wherein the gases are cooled to approximately 22° C. to liquefy the greater part of the ammonia. The mixture is then passed through line 17 to separator 18 wherefrom liquid ammonia is withdrawn through line 19 to flash tower 20. In flash tower 20 the liquid ammonia product is flashed by reduction of pressure to remove absorbed inert gases. The purified liquid anhydrous ammonia product is withdrawn through lines 31, 32 and 33 to storage. Flashed gases are withdrawn from flash tower 20 through line 35 to condenser 36 wherein ammonia is condensed and passed through lines 38 and 33 to storage. Gases from condenser 36 are passed through line 37 to a water scrubber (not shown) wherein the last traces of ammonia are scrubbed out to form aqueous ammonia.

Circulating compressor 21 takes suction on the cycle gases in separator 18 through line 22, increases the pressure thereon from about 4750 p.s.i.g. to about 5400 p.s.i.g. and moves said gases through line 23, filter 24 and line 25 to cold exchanger 26. The gases are passed from the mid point of cold exchanger 26 through line 27 to ammonia refrigerated secondary condenser 28 wherein said mixture is cooled to about −2° C. and returned to said cold exchanger through line 29. Liquid anhydrous ammonia is withdrawn through lines 30 and 19 to flash tower 20 for flashing as described above. Uncondensed gases are withdrawn through line 13 for recycle to converter 14 after admixture with fresh synthesis gas from line 12 as described.

Prior to entering separator 18 and cold exchanger 26 the cycle gases are admixed with a portion of the liquid ammonia product from line 31 which is passed through line 34A to line 17 and through line 34 to line 25. In separator 18 and cold exchanger 26 the liquid ammonia product introduced through line 34 absorbs inerts from the cycle gases. Said inerts are then flashed from the liquid ammonia in flash tower 20 as described. Thus when operating according to this embodiment of my invention cold exchanger 26 serves a dual purpose: (1) as an absorption vessel wherein the liquid ammonia product absorbs inerts from the cycle gases and (2) as a heat exchanger wherein uncondensed ammonia is recovered from the cycle gases.

The above description represents one embodiment of my invention as applied to an existing plant for the synthesis of ammonia. In this preferred embodiment the concentration of total inerts in the cycle gases is maintained within the range of 15 to 40 mol percent and preferably within the range of 25 to 30 mol percent. No purge by venting is employed and all the inerts entering the system, in excess of the amount necessary to maintain the concentration of inerts within the said range, are removed by absorption in the liquid anhydrous ammonia. Some of the inerts are absorbed in the liquid ammonia withdrawn from separator 18. However, the greater part of the inerts are removed by absorption in the liquid ammonia in cold exchanger 26. Tests have shown that in order to remove all the inerts entering the system and maintain the concentration of total inerts within the preferred range, without resorting to wasteful purging by venting, the recycle of liquid ammonia to cold exchanger 26 is necessary.

It is to be noted that the concentration of total inerts is maintained within the range of 25–30 mol percent as compared to 15–20 mol percent when employing purging by venting as was practiced prior to my invention. In other words, due to the preferential absorption of methane the partial pressures of the other inerts, helium plus argon, has been increased, at this concentration of total inerts, and at the pressures employed, to the point where all the inerts can be removed from the system by absorption in the liquid ammonia.

At the concentrations of inerts normally maintained in the cycle gases, approximately 15 mol percent, the partial pressure of the helium plus argon after removal of the methane is not sufficient to cause all of said helium plus argon to dissolve in the liquid ammonia. It is for this reason that I purposely allow the total concentration of inerts to increase. For the system studied I have found that 25–30 mol percent is the optimum range of inerts concentration to employ. Obviously for other systems the optimum concentration may be different as is pointed out below.

The following examples illustrate the advantages of my invention. Example I shows the superiority of removing inerts by absorption in liquid ammonia over purging inerts by venting. In Example II, calculations based on a run over an extended period show the greater efficiency obtained when operating according to my invention compared to prior operation. Example III shows the desirability of employing recycle of the liquid ammonia product and indicates the upper limit on the inerts concentration in the cycle gases for the system studied.

*Example I*

| | Fresh synthesis gas | Cycle gas |
|---|---|---|
| Hydrogen, mol percent | 74.3 | 60.1 |
| Nitrogen, mol percent | 24.5 | 20.0 |
| Helium plus argon, mol percent | 0.6 }1.2 | 9.2 }17.4 |
| Methane, mol percent | 0.6 | 8.2 |
| Ammonia, mol percent | | 2.5 |
| | 100.0 | 100.0 |

| | Mols per mol of fresh synthesis gas |
|---|---|
| Methane absorbed in liquid ammonia product | 0.00265 |
| Helium plus argon absorbed in liquid ammonia product | 0.0011 |
| Total inerts absorbed | 0.00375 |
| Total ammonia-free gas absorbed (includes $H_2$ and $N_2$) | 0.015 |

Total inserts absorbed $\frac{0.00375}{0.015}\times 100=25$ percent

Therefore, $H_2+N_2$ absorbed=75 percent

When purging through line 39, and without recycle of liquid ammonia to cold exchanger 26, the above cycle gas purged, on an ammonia-free basis, has the following composition:

| | | |
|---|---|---|
| Hydrogen, mol percent | 61.7 | 82.2 |
| Nitrogen, mol percent | 20.5 | |
| Helium plus argon, mol percent | 9.4 | 17.8 |
| Methane, mol percent | 8.4 | |

Therefore, for the conditions studied, each mol of gas removed by absorption in liquid ammonia results in the removal of 0.25 mol of inerts; whereas, a mol purged by venting in the usual manner removes only 0.178 mol of inerts. The difference, 0.25−0.178=0.072, represents the additional hydrogen and nitrogen lost by venting. Since according to the equation $$3N_2+N_2\rightarrow 2NH_3$$

one mol of $H_2+N_2$ mixture produces one-half mol of ammonia this represents a direct loss of 0.038 mol of potential ammonia for each mol of cycle gas vented. The ammonia vented in the cycle gas is not considered in this example since the vented gases are scrubbed with water to recover the greater part of said ammonia as aqueous ammonia.

*Example II*

When operating according to my invention with recycle of liquid ammonia to the cold exchanger, no purging by venting, and maintaining the concentration of total inerts at 25 mol percent, there was a marked increase in the overall-efficiency of the plant as shown below.

| | With purging of inerts by venting | With removal of inerts by absorption in liquid ammonia |
|---|---|---|
| Fresh synthesis gas charge ........ lbs./hr./unit | 7,650 | 7,650 |
| Total inerts content ........ mol percent | 15 | 25 |
| Production anhydrous $NH_3$ ........ tons/day/unit | 78.7 | 79.6 |
| Production aqueous $NH_3$ ........ do | 2.2 | 8.1 |
| Efficiency $\frac{NH_3}{N_2+H_2}\cdot 100$ ........ percent | 90.8 | 98.2 |

The increase in efficiency from 90.8 percent to 98.2 percent is directly attributable to the elimination of the loss of potential ammonia, i.e., $H_2$ and $N_2$, through venting. Loss of ammonia through venting is also eliminated since even though the vent gases are scrubbed with water all of the ammonia vented is not recovered. It should be noted that this increase in efficiency is obtained even though the mol percent of inerts in the cycle gas was increased from 15 mol percent to 25 mol percent.

*Example III*

In another run the concentration of inerts in the cycle gases was maintained at 40 mol percent. During this run no recycle of liquid ammonia product through lines 31 and 34 to line 25 was employed. Otherwise the operating conditions were substantially the same. It was found that the production of ammonia was reduced from approximately 75 tons per day per unit to approximately 50 tons per day per unit. Thus, this run shows (1) that the partial pressure of the helium plus argon can be increased, by the preferential absorption of methane, to the extent that all the inerts entering the system can be removed; (2) the desirability of employing recycle of liquid ammonia product as in my preferred embodiment; and (3) there is an upper limit to the concentration of inerts in the cycle gases.

The existence of this upper limit is of course to be expected. Actually the optimum concentration of inerts to be maintained in the cycle gases will vary from plant to plant. In some plants the capacity of the conversion system is the factor limiting plant production. In other plants the availability of fresh synthesis gas is the limiting factor. Obviously, those plants having excess conversion capacity can tolerate a higher concentration of inerts in the cycle gases.

In some plants depending upon the balance between the availability of fresh synthesis gas and the capacity of the conversion step, the amount of inerts present in the raw natural gas, and other factors, it may be desirable to employ both purging of inerts by venting and removal of inerts by absorption in liquid ammonia product.

Thus, in another embodiment of the invention the concentration of inerts in the cycle gas is maintained at some level within the range of 15 to 40 mol percent. Recycle of liquid ammonia product from flash tower 20 through lines 31 and 34 to line 25 and cold exchanger 26 is employed as described above in connection with the drawing. The greater part of the inerts in the cycle gas, in excess of the amount necessary to maintain the concentration at the desired level, are removed by absorption in the liquid ammonia product. The remainder of the excess inerts are purged from the system by venting through line 39, to maintain the concentration of inerts at the desired level within the said range. The level at which the concentration of inerts is maintained will depend primarily upon the balance between the availability of fresh synthesis gas and the capacity of the conversion step. As explained above the concentration of inerts can be maintained at a higher level in those systems having excess conversion capacity.

When employing the last described embodiment of my invention the purging by venting can be carried out at other points in the system than through line 39. In a Haber type ammonia synthesis system, there are four distinct points in the system at which purging by venting can be carried out. These are:

A. The vent, line 39, is located between the cold exchanger 26 and converter 14. Fresh synthesis gas is added downstream from the vent.

B. The vent, line 40, is located between cold exchanger 26 and converter 14. Fresh synthesis gas is added upstream from the vent.

C. The vent, line 41, is located between converter 14 and primary condenser 16.

D. The vent, line 42, is located after separator 18.

These points, as identified above, are shown on the attached diagrammatic flow sheet. When employing the last described embodiment of my invention, i.e., a combination of absorption of inerts and venting of inerts, any of these venting points can be used. Likewise fresh synthesis gas can be introduced into the system at points other than through line 10, for example line 43. In choosing the point of venting and the point of introduction of fresh synthesis gas, it is important to consider the balance between the availability of fresh synthesis gas and the capacity of the conversion system. If the capacity of the conversion system is the factor limiting plant production then the point of venting should be at the point where the least amount of synthesized ammonia will be vented. On the other hand, if the availability of fresh synthesis gas is the limiting factor, the point of venting should be at the place in the system where the loss of hydrogen and ammonia as potential ammonia, plus the loss of synthesized ammonia, will be at a minimum. For example, in the system studied the limiting factor was the availability of fresh synthesis gas. Therefore, the point of venting is preferably through line 39 upstream from the introduction of fresh synthesis through line 12. Thus, the loss of both potential ammonia and synthesized ammonia is a minimum. Other combinations of point of venting in relation to point of introduction of fresh synthesis gas when employing my invention will be obvious to those skilled in the art in view of this disclosure.

The invention has been described as employed in connection with an existing ammonia synthesis plant. However, it is within the scope of the invention to employ a separate contact tower other than cold exchanger 26 for absorbing inerts in the liquid ammonia product.

Likewise, it is within the scope of the invention to employ a separate contact tower on the incoming stream of fresh synthesis gas. In such an embodiment a portion of the cycle gases can be circulated through said contact tower to remove any inerts which build up in the synthesis system.

The amount of absorbent employed to contact the cycle gases and remove inerts therefrom will depend primarily upon (1) the amount of inerts entering the system and (2) whether all the inerts entering the system, in excess of the amount necessary to maintain the concentration of inerts at the desired level, are removed by absorption or by a combination of absorption of inerts and venting of inerts. Obviously, the more inerts removed by absorption the more absorbent that will be required.

The invention is not to be limited by the particular operating conditions given by way of example in connection with the system studied. For example: this particular plant requires an inlet pressure in the range 5350–5450 p.s.i.g. and a pressure drop across the system of 600–700 p.s.i.; but the process of the invention is applicable to the broader range of pressures utilized by other ammonia synthesis systems in which inlet pressures of 200–400 atmospheres are employed. For other systems and other processes other operating conditions suitable thereto would be employed.

While the invention has been described as employed in an ammonia synthesis plant, it is not to be so limited. The invention can be employed for the removal of inerts from the reactants of other systems. Likewise, while the invention has been described as employing a liquid absorbent, and particularly the liquid product of the system, other non-liquid absorbents can be employed. Such non-liquids, depending upon the system in which the invention is employed, would include activated charcoal, silica gel, activated alumina, bauxite, activated clays such as fuller's earth, synthetic gels, etc.

Reasonable variation and modification are possible within the scope of the foregoing disclosure, drawing, and the appended claims to the invention, the essence of which is preferentially absorbing in an absorbent at least one inert from a mixture of inerts contained in a stream of reactants and increasing the partial pressure of remaining inerts to the extent that said remaining inerts are absorbed in said absorbent and thereby removed from said reactants.

I claim:

1. In a system for the synthesis of ammonia wherein nitrogen and hydrogen, contained in a first mixture of gases comprised of nitrogen, hydrogen, methane, helium and argon, are reacted in the presence of a catalyst in a reaction zone under ammonia producing conditions to form an ammonia product which is subsequently liquefied and wherein unreacted cycle gases containing nitrogen, hydrogen, and a mixture of gases inert to said reaction comprising methane, helium, and argon are recycled to said reaction zone, the steps of: contacting said cycle gases with a portion of said liquid ammonia product in an absorption zone; preferentially absorbing methane from said mixture of gases inert to said reaction; and increasing the partial pressures of remaining said gases inert to said reaction to the extent that additional gases inert to said reaction are absorbed in said absorbent.

2. The method of claim 1 wherein said first mixture also contains neon, zenon, and krypton, and said mixture of gases inert to said reaction consists essentially of methane, helium, argon, neon, xenon, and krypton.

3. A method of operating an ammonia synthesis system wherein nitrogen and hydrogen are reacted to form ammonia which comprises: introducing fresh synthesis gas comprised of nitrogen, hydrogen and a mixture of gases inert to said reaction comprising methane, helium and argon into said system at a predetermined point; forming an admixture of said fresh synthesis gas and cycle gases also comprised of nitrogen, hydrogen and a mixture of said gases inert to said reaction; passing said admixture at a predetermined pressure to a conversion zone; converting a portion of said nitrogen and hydrogen into ammonia; condensing the greater portion of said ammonia product and passing same to a flash vaporization zone; increasing the pressure on unreacted cycle gases from said conversion zone to said predetermined pressure; contacting said cycle gases with a portion of said liquid ammonia product; preferentially absorbing methane in said portion of liquid ammonia product from said cycle gases; maintaining a predetermined concentration of gases inert to said reaction in said cycle gases; passing said liquid ammonia product containing absorbed gases inert to said reaction to said flash vaporization zone; flash vaporizing a portion of said liquid ammonia product to remove absorbed gases inert to said reaction therefrom; passing flashed liquid ammonia product to storage; admixing unabsorbed cycle gases with said fresh synthesis gas to form said admixture and repeating said operation.

4. The method of claim 3 wherein said concentration of gases inert to said reaction in said cycle gases is maintained within the range of 20 to 40 mol percent.

5. In a system for the synthesis of ammonia wherein a synthesis gas comprising hydrogen and nitrogen together with a mixture of gases inert to said reaction comprising methane, helium and argon is employed, the method of operation which comprises: admixing under predetermined pressure fresh synthesis gas with cycle gases produced in said system and also containing a mixture of said gases inert to said reaction to form a first admixture; passing said first admixture to a conversion zone; contacting said first admixture with a catalyst in said conversion zone to form a gaseous reaction mixture comprising ammonia and unreacted cycle gases; passing said gaseous reaction mixture through a condensing zone to condense the greater part of said ammonia and then into a separation zone; separating liquid ammonia product from unreacted cycle gases; passing said liquid ammonia to a flash vaporization zone; withdrawing cycle gases from said separation zone and increasing the pressure on said cycle gases to said predetermined pressure; introducing a portion of said liquid ammonia product from said flash vaporization zone into said cycle gases to form a second admixture; passing said second admixture into a combined heat exchange and absorption zone and therein, passing said second admixture in heat exchange relationship with a refrigerant, preferentially absorbing methane in said liquid ammonia from said gases inert to said reaction contained in said cycle gases; maintaining a predetermined concentration of gases inert to said reaction in said cycle gases; passing liquid ammonia from said combined zone to said flash vaporization zone; flash vaporizing a portion of said liquid ammonia to remove absorbed gases inert to said reaction therefrom; passing liquid ammonia product to storage; withdrawing cycle gases from said combined zone and admixing same with said fresh synthesis gas to form said first admixture and repeating said operation.

6. The method of claim 5 wherein a portion of said cycle gases withdrawn from said combined zone is vented from said system prior to admixture with said fresh synthesis gas to form said first admixture.

7. The method of claim 5 wherein said concentration of said gases inert to said reaction in said cycle gases is maintained within the range of 25 to 30 mol percent.

8. In a system for the synthesis of ammonia wherein nitrogen and hydrogen, contained in a synthesis gas which also contains a mixture of gases inert to the reaction comprising methane, helium and argon, are reacted in the presence of a catalyst in a reaction zone under ammonia producing conditions to form an ammonia product which is subsequently liquefied and wherein unreacted cycle gases containing nitrogen, hydrogen, and a mixture of gases inert to said reaction consisting essentially of methane, helium and argon are recycled to said reaction zone, the steps of: contacting said cycle gases with a portion of liquid ammonia product in an absorption zone; preferentially absorbing methane from said mixture of gases inert to said reaction contained in said cycle gases; passing contacted cycle gases together with fresh synthesis gas at a predetermined pressure to said reaction zone; withdrawing unreacted cycle gases from said reaction zone; increasing the pressure on said withdrawn cycle gases to the extent that the partial pressures of remaining said gases inert to said reaction contained in said unreacted cycle gases are increased to the extent that additional gases inert to said reaction, in addition to said preferentially absorbed methane, can be absorbed in said liquid ammonia; and passing said cycle gases to said absorption zone to absorb a portion of said additional gases inert to said reaction.

9. In a system for the synthesis of ammonia wherein nitrogen and hydrogen, contained in a synthesis gas which also contains a mixture of gases inert to the reaction comprising methane, helium and argon, are reacted in the presence of a catalyst in a reaction zone under ammonia producing conditions to form an ammonia product which is subsequently liquefied and wherein unreacted cycle gases containing nitrogen, hydrogen, and a mixture of gases inert to said reaction consisting essentially of methane, helium and argon are recycled to said reaction zone, the steps of: contacting said cycle gases with a portion of said liquid ammonia product in an absorption zone; preferentially absorbing methane from said mixture of gases inert to said reaction contained in said cycle gases; passing contacted cycle gases together with fresh synthesis gas at a predetermined pressure to said reaction zone; withdrawing unreacted cycle gases from said reaction zone; causing the concentration of gases inert to said reaction contained in said withdrawn cycle gases to increase to the extent that the partial pressures of remaining said gases inert to said reaction contained in said unreacted gases are increased to the extent that additional gases inert to said reaction, in addition to said preferentially absorbed methane, can be absorbed in said liquid ammonia; and passing said cycle gases to said absorption zone to absorb a portion of said additional gases inert to said reaction.

10. In the concentration of nitrogen and hydrogen from a stream of gases also containing a mixture of other gases comprising methane, argon, and helium, the process comprising contacting said stream of gases with liquid ammonia, preferentially absorbing said methane from said mixture and then increasing the partial pressures of said argon and helium to the extent that at least a portion of said argon and helium are absorbed in said ammonia and removed from said mixture.

11. The method of claim 5 wherein a portion of said first admixture is vented from said system upstream of said conversion zone.

12. The method of claim 5 wherein a portion of said gaseous reaction mixture is vented from said system at a point upstream of said separation zone.

13. The method of claim 5 wherein a portion of said cycle gases withdrawn from said separation zone is vented from said system at a point after said withdrawn cycle gases have been compressed.

References Cited in the file of this patent

UNITED STATES PATENTS

| | | |
|---|---|---|
| 491,365 | Luhman | Feb. 7, 1893 |
| 1,815,243 | DeJahn | July 21, 1931 |
| 1,875,926 | Hughes | Sept. 6, 1932 |
| 1,889,934 | Richardson | Dec. 6, 1932 |
| 2,521,233 | Latchum | Sept. 5, 1950 |
| 2,596,785 | Nelly, et al. | May 13, 1952 |
| 2,660,514 | Rohrman | Nov. 24, 1953 |
| 2,661,812 | Gilmore | Dec. 8, 1953 |

UNITED STATES PATENT OFFICE

CERTIFICATE OF CORRECTION

Patent No. 2,881,053 April 7, 1959

Frederick A. Bowers

It is hereby certified that error appears in the printed specification of the above numbered patent requiring correction and that the said Letters Patent should read as corrected below.

Column 1, line 63, for "liqiuds" read -- liquids --; column 5, line 24, for "inserts" read -- inerts --; line 42, for "$3N_2\uparrow$" read -- $3H_2\uparrow$ --; column 10, list of references cited, line 51, for "Nelly, et al" read -- Nelly, Jr. et al. --.

Signed and sealed this 12th day of January 1960.

(SEAL)
Attest:

KARL H. AXLINE
Attesting Officer

ROBERT C. WATSON
Commissioner of Patents